United States Patent
Bryant et al.

(10) Patent No.: US 7,430,881 B2
(45) Date of Patent: Oct. 7, 2008

(54) METHOD OF MAKING AN OPTICAL FIBER ATTACHMENT DEVICE

(75) Inventors: Rebecca M. Bryant, Glastonbury, CT (US); Christopher J. Wright, Bend, OR (US); Michael Arcand, Portland, CT (US); Christopher T. Chipman, Scotland, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 599 days.

(21) Appl. No.: 10/755,722

(22) Filed: Jan. 12, 2004

(65) Prior Publication Data

US 2004/0165834 A1    Aug. 26, 2004

Related U.S. Application Data

(60) Provisional application No. 60/439,106, filed on Jan. 10, 2003, provisional application No. 60/439,243, filed on Jan. 10, 2003.

(51) Int. Cl.
*C03B 37/027* (2006.01)
*C03B 23/207* (2006.01)

(52) U.S. Cl. ............................. 65/378; 65/392; 65/412; 65/411

(58) Field of Classification Search .................. 65/379, 65/378, 392, 393, 412, 411, 410, 409, 428
See application file for complete search history.

(56) References Cited

U.S. PATENT DOCUMENTS

| | | | | |
|---|---|---|---|---|
| 3,932,162 A * | 1/1976 | Blankenship | ................. | 65/421 |
| 4,236,904 A * | 12/1980 | Lazay | ........................... | 65/378 |
| 4,591,372 A * | 5/1986 | Bricheno et al. | .............. | 65/402 |
| 4,810,277 A * | 3/1989 | Waitl et al. | ..................... | 65/407 |
| 4,877,300 A * | 10/1989 | Newhouse et al. | ............ | 385/43 |
| 4,902,323 A * | 2/1990 | Miller et al. | .................. | 65/407 |
| 4,950,883 A * | 8/1990 | Glenn | ................... | 250/227.14 |
| 4,954,152 A * | 9/1990 | Hsu et al. | ...................... | 65/392 |
| 4,986,620 A * | 1/1991 | Severijns et al. | .............. | 385/15 |
| 5,098,459 A * | 3/1992 | Fukuma et al. | ................ | 65/410 |
| 5,157,747 A * | 10/1992 | Aktins et al. | .................. | 385/37 |
| 5,177,803 A * | 1/1993 | Newhouse et al. | ............ | 385/43 |
| 6,009,220 A * | 12/1999 | Chan et al. | ..................... | 385/24 |
| 6,128,927 A * | 10/2000 | Ahrens et al. | ................. | 65/392 |
| 6,229,827 B1 * | 5/2001 | Fernald et al. | ................. | 372/20 |
| 6,246,817 B1 * | 6/2001 | Griffin | ........................ | 385/43 |
| 6,307,990 B1 * | 10/2001 | Carberry et al. | ............... | 385/37 |
| 6,463,872 B1 * | 10/2002 | Thompson | ................. | 118/50.1 |
| 6,519,388 B1 * | 2/2003 | Fernald et al. | ................. | 385/37 |

OTHER PUBLICATIONS

SYTSMA, The Basics of Experimental Design [A Quick and Non-Technical Guide], pp. 1-13, Apr. 10, 2001, from www.sytsma.com/phad530/expdesig.html.*

* cited by examiner

*Primary Examiner*—John Hoffmann
(74) *Attorney, Agent, or Firm*—Patterson & Sheridan, LLP (57) ABSTRACT

Low-loss large diameter optical waveguide attachment devices (i.e., pigtails) and methods and systems of making the same are provided. The optical waveguide attachment devices may include an optical fiber (or other type waveguide) embedded in a larger diameter carrier tube. According to some embodiments, multiple laser beams (from one or more laser) may be utilized to uniformly heat the circumference of the carrier tube. According to some embodiments a maria may be formed in one end of the capillary tube to facilitate optical waveguide insertion and/or provide strain relief.

6 Claims, 6 Drawing Sheets

METHOD OF MAKING AN OPTICAL FIBER ATTACHMENT DEVICE

CROSS-REFERENCE TO RELATED APPLICATIONS

This application claims benefit of U.S. provisional patent application Ser. Nos. 60/439,106 and 60/439,243, both filed Jan. 10, 2003, which are herein incorporated by reference.

BACKGROUND OF THE INVENTION

1. Field of the Invention

Embodiments of the present invention relate to optic waveguide attachment techniques and, more particularly, to low-loss large diameter pigtails.

2. Description of the Related Art

In many fiber-optic applications, it is desirable to attach an optical fiber "pigtail" to larger diameter optical waveguide devices, such as sensor elements. Prior art attachment techniques employ the encapsulation of the fiber in a capillary (tube or carrier or ferrule) with thermally-cured or light-cured epoxy filling the gap between the fiber outer diameter and capillary inner diameter. However, the use of epoxy in the pigtail limits the heat, humidity, and corrosiveness of the environments into which the device is placed.

Further, the use of epoxy typically prevents the pigtail from being fused to the larger device as the heat of the fusion process would melt or burn the epoxy and contaminate the glass. As a result, the encapsulated fiber pigtail is typically epoxied to the larger diameter device. The optical losses associated with these types of pigtails attachments (e.g., due to epoxy in the optical path) are typically at best 0.2 dB. In addition, epoxies have temperature operating limitations that are an order of magnitude below those of glass. Thus, removing the epoxy from the pigtail would allow the device to be used in a wider range of environments, and it could permit the pigtail to be fused (spliced) onto the larger diameter device.

U.S. Pat. No. 5,745,626, entitled "Method For And Encapsulation Of An Optical Fiber" which is incorporated herein by reference, describes a technique in which a 125 um diameter fiber is inserted into a ferrule with an ID of 126 um and heated until the ferrule collapses onto the fiber. However, the restriction of the ferrule ID to 1 um greater than the fiber OD does not allow for relaxed tolerances of the ferrules and fiber. Insertion of the fiber into the close-fitting ferrule is therefore difficult and often results in fiber breakage. It is possible that the need for the tightly matched diameters of fiber to ferrule is due to the fact that the collapse is achieved by heating the glass on one side instead of heating the circumference of the ferrule uniformly.

A method that addresses the circumferential heating of the capillary during a collapse is described in the commonly assigned U.S. Pat. No. 6,519,388, entitled, "Tube-Encased Fiber Grating," which is incorporated herein by reference. This method uses a laser beam focused on one side of the capillary/fiber combination. The collapse pieces are held in a vacuum chuck in order to aid the draw down of the capillary onto the fiber. The vacuum chuck rotates the collapse pieces about their longitudinal axis such that the laser beam heats its entire circumference. In addition to being rotated, the part is translated along its longitudinal axis within the beam path to achieve the desired collapse length.

While this method heats the part around its circumference, in some cases, the heating may still not be sufficiently uniform and may result in a collapse that "spirals" down the capillary as the pieces are rotated and translated relative to the laser beam. Also, as the system rotates, any misalignment or bend in the capillary or extending fiber may become exaggerated by the centrifugal force, which may causes the piece to bend where the heat has softened the glass creating a corresponding throughput loss. Any air current or other disturbance to the fiber may result in the same bending tendency. Furthermore, since the laser heats the capillary on only one side at any given time, the transition from the non-collapsed to the collapsed region may not be uniform. This may cause the fiber to tend toward the side where the glass first melts, resulting in microbends in the fiber and consequent throughput loss.

Accordingly, there is a need for methods and systems for producing a fiber/carrier pigtail that exhibits low levels of optical loss.

SUMMARY OF THE INVENTION

The present invention generally provides low loss large diameter attachment devices and methods of producing the same.

One embodiment provides a method for producing an optical waveguide attachment device. The method generally includes inserting a bare end of an optical waveguide into a first end of a capillary tube, wherein a portion of the optical waveguide extends from the first end, and heating a portion of the capillary tube by exposure to at least two laser beams to collapse the capillary tube onto the optical waveguide.

Another embodiment provides another method for producing an optical waveguide attachment device. The method generally includes forming a maria in one end of a capillary tube, inserting a bare end of an optical waveguide into the first end of the capillary tube through the maria, wherein a portion of the optical waveguide extends from the first end, and heating a portion of the capillary tube by exposure to at least two laser beams to collapse the capillary tube onto the optical waveguide.

Another embodiment provides a system for producing an optical attachment device having a optical waveguide encased in a capillary tube. The system generally includes at least one source laser to provide at least one laser beam, a stage to hold the capillary and optical waveguide wherein the stage is movable along a longitudinal axis of the capillary tube to vary the position of the capillary tube and optical waveguide in a path of the at least one laser beam, and a beam delivery arrangement to deliver at least two laser beams to different locations about the circumference of the capillary tube, wherein the at least two laser beams are generated from the at least one laser beam provided by the at least one source.

Another embodiment provides an optical waveguide attachment device generally including a capillary tube, a maria formed in a first end of the capillary tube, an optical waveguide onto which at least a portion of the capillary tube is collapsed, wherein at least a portion of the optical waveguide extends from the first end of the capillary tube, and strain relief material disposed in the maria.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention provide techniques and systems that may be used to produce low-loss large diameter optical fiber pigtails in which an optical fiber (or other type waveguide) is embedded in a larger diameter carrier tube. According to some embodiments, multiple laser beams (from one or more laser) may be utilized to uniformly heat the circumference of the carrier tube. As a result, when compared with conventional fiber pigtails, fiber pigtails in accordance with embodiments of the present invention may have reduced microbending in the encased fiber and, therefore, less corresponding optical loss.

As used herein, the term pigtail generally refers to an end of an optical waveguide (such as an optical fiber) encased or embedded in a carrier or larger diameter glass structure allowing the optical waveguide to be optically coupled to a large diameter optical element. As such, a pigtail may be considered an attachment end or attachment device of an optical waveguide to facilitate and enable optical connection to a large diameter optical element. As described in the commonly assigned co-pending U.S. application Ser. No. 10/755,708, now U.S. Publication No. 2004/0165841, entitled "Large Diameter Splice" filed herewith and incorporated herein by reference, examples of larger diameter optical elements to which a pigtail may be attached include, but are not limited to, other pigtails (e.g., allowing sections of fiber to be coupled or "spliced" with low loss), and large diameter optical waveguide sensor elements. The optical waveguide or fiber may be a single mode or multimode fiber of any known configuration and diameter and may be advantageously selected to be compatible with the numerical aperture or other optical characteristics of the larger diameter optical elements. The pigtail attachment to a larger diameter optical element of the present invention facilitates the subsequent optical connection of the fiber to other fibers, connectors, or other optical components by suitable splicing techniques as are known in the art.

Figure 1:
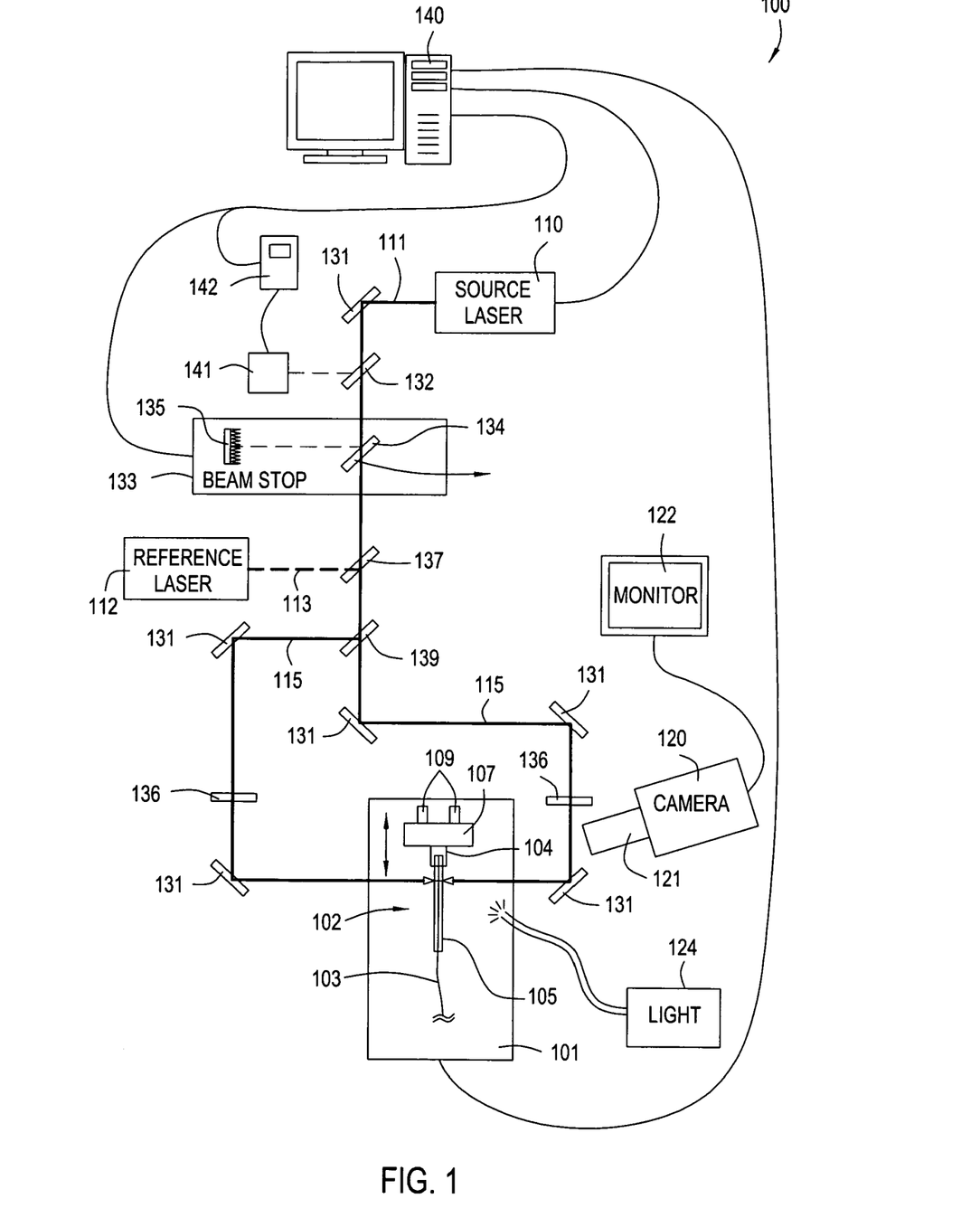
FIG. 1 illustrates an exemplary system for producing a low-loss large-diameter pigtail in accordance with one embodiment of the present invention.

FIG. 1 illustrates an exemplary system 100 for producing a low-loss large diameter pigtail 102 in accordance with aspects of the present invention. The pigtail 102 (shown in greater detail in FIG. 2A described below) may be formed by encasing an optical fiber 103 (or other type optical waveguide), in a glass (e.g., silica-based) capillary tube 105. As will be described in greater detail below, the tube 105 may be collapsed onto fiber 103 by uniformly heating a portion of the tube 105 to be collapsed with one or more laser beams 115 generated from one or more source lasers 110.

To facilitate uniform heating, the system 100 includes a holding assembly 101 with a movable stage (or fixture) 104 for holding the fiber 103 and tube 105 (collectively referred to as the workpiece) within the path of the beams 115 during a collapse process. The fixture 104 may be movable along a longitudinal axis of the workpiece to control the position of (i.e., translate) the workpiece within the path of the beams 115. For some embodiments, the fixture 104 may be mounted on a motor controlled lathe 107 allowing rotation of the workpiece, further enhancing uniform heating about the circumference of the workpiece. For such embodiments, the fixture 104 may include a tail stock (not shown) with a bore through which excess fiber attached to the waveguide section 102 may be routed. The speed of rotation may vary depending on an exact workpiece, but may be around 20 rpm for some workpieces. The lathe 107 may also include one or more ports 109 allowing a vacuum and/or pressurized gas to be applied to the workpiece during processing, for reasons discussed in greater detail below.

The one or more beams 115 may be generated by splitting a single beam 111 from the source laser 110, via one or more beam splitters 139. As previously described, directing multiple beams 115 to different locations about a collapse region may provide more uniform heating than a single beam. As illustrated, the split beams 115 may be focused and directed to different locations (e.g., separated by approx. 180° for two beams 115) about the splice region of the waveguide sections 102 and 104 by an arrangement of lenses 136 and mirrors 131. The exact size, type, and configuration of the lenses 136 and mirrors 131 will determine the actual size and shape of the beams 115 and may be chosen according to the size and type of the fiber 103 and tube 105. For some embodiments, rather than generating the multiple beams by splitting a beam from a single source, beams from multiple source lasers may be directed to the collapse region of the workpiece.

In any case, the system 100 may also include a reference laser 112 (e.g., a HeNe laser) that provides a beam 113 of visible light for use as a reference, for example, to assist in positioning the workpiece (e.g., prior to turning on the laser 110). As illustrated, the reference beam 113 may be provided by a combiner 137, split and travel the same path to the workpiece as the source beam 111. A camera 120 with a magnifying lens 121 may be used to provide (to an operator) an image of the workpiece relative to the visible beams on a monitor 122. To precisely position the workpiece, the operator may move the workpiece until the visible beams are incident on a desired position about the workpiece. The reference laser 112 may be turned off prior to turning on the source laser 110.

Various components of the system 100 may be controlled by a controller 140 which may be implemented, for example, as a general purpose computer system equipped with I/O interface cards and running appropriate control software (e.g., National Instrument's LabView). For example, the controller 140 may be configured to move the workpiece before and during collapse operations (e.g., by controlling the fixture 104 and/or lathe 107) via one or more stepper motors (not shown). For some embodiments, the controller 140 may be configured with an operator interface, for example, allowing an operator to manually set laser power levels, control the position of the workpiece, and initiate automatic operations.

For example, the controller 140 may be configured to run pre-programmed "scripts" where the power of the laser 110 is automatically adjusted and/or the position of the workpiece within the path of the beams 115 is adjusted by moving the stage 104. For some embodiments, the controller 140 may monitor the actual output power of the laser 110 via a detector 141 and a laser power meter 142, thus providing a feedback loop and allowing for precise laser power adjustments. As illustrated, the detector 141 may detect a small portion of the laser beam 111, such as the weak side of an unbalanced beam splitter 132 (e.g., the 10% side of a 90/10 beam splitter).

The controller 140 may also be configured to control exposure of the waveguide sections 102-104 to the beams 115 via a beam stop assembly 133, illustratively including a shutter 134 and shutter control 135. For some embodiments, the controller 140 may be configured to control collapse operations by exposing the waveguide sections 102-104 at each power level for corresponding predetermined amounts of time, with the exact times and power levels determined, for example, based on the exact dimensions and materials of the optical waveguide sections 102-104. As will be described in greater detail below, the system 100 may also include equipment to measure the optical power loss through the fiber 103 before and after collapse of the tube 105.

Figure 2A:
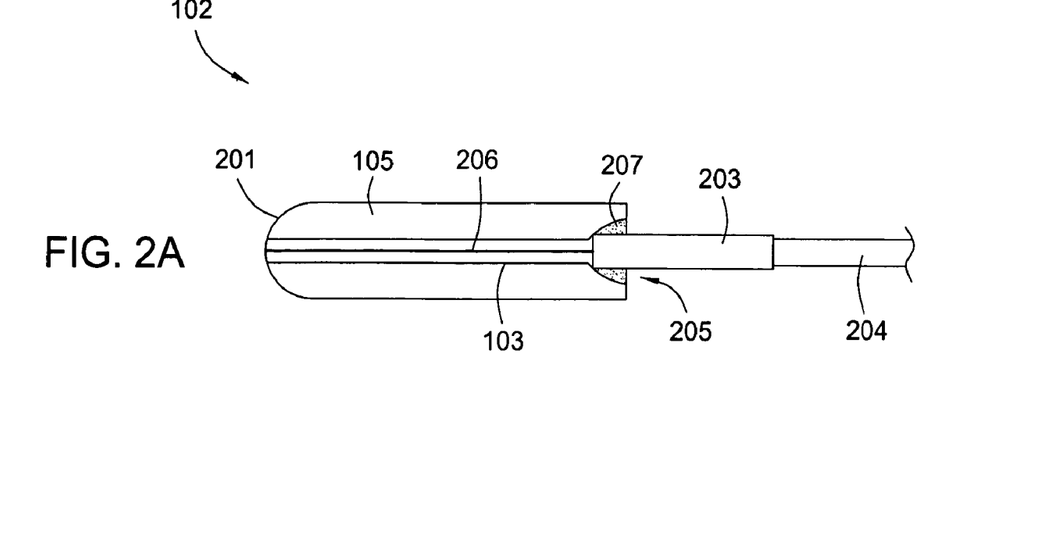
FIGS. 2A-2C illustrate a low loss large diameter pigtail and user thereof in accordance with one embodiment of the present invention.

FIG. 2A shows a detailed view of one embodiment of a pigtail 102 that may be produced using the system 100. As illustrated, the fiber 103 may be inserted into a maria 205 formed in one end of the tube 105. While the fiber is held in place by the collapse (or fusion) of the tube 105 onto the fiber 103, for some embodiments, epoxy 207, or some other suitable type adhesive may be disposed in the gap between the fiber 105 and the maria 205 to provide strain relief at a transition region from the collapsed section to the maria 205. A tube or sleeve 203 of a protective material (e.g., polyimide) may also be disposed around the fiber 105 leading into the maria 205 and a remaining portion of the fiber may be coated with a protective coating 204.

Figure 2B:
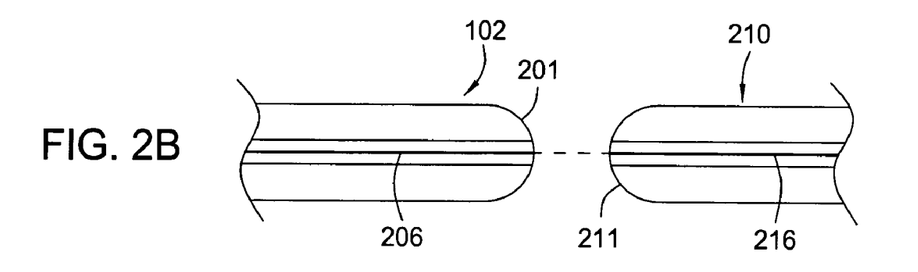
Figure 2C:
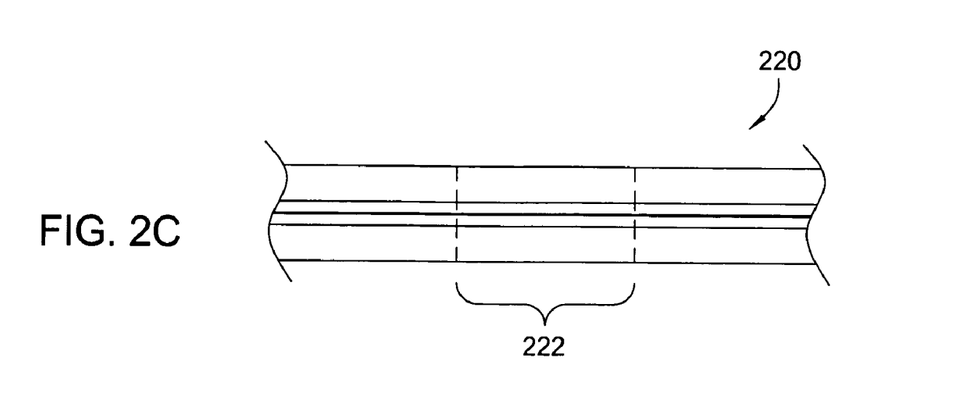

As shown, the end of the pigtail 102 opposite the maria 205 (the "non-fiber" end 201) may be polished to achieve a slight curvature (e.g. 0.004-0.006 um RA). As illustrated in FIG. 2B, this curvature may facilitate the alignment of a core 206 of the encased fiber 103 with a core 216 of a large diameter optical waveguide structure 210 to be fused to the pigtail 102. Precise alignment of the cores 206 and 216 may result in reduced optical loss across a fused region 222 of the resultant structure 220 after fusion (shown in FIG. 2C). The curvature of the non-fiber end 201 may also prevent air from being trapped in the fused region 222 during fusion operations. It should be noted that any epoxy 207 used for strain relief in the pigtail 102 is distanced from fused region 222 and will, thus, not be exposed to high heat during fusion. It is also within the scope of the present invention that the epoxy 207 used for strain relief may be disposed after the fusing operations described herein below.

Of course, the dimensions of the various components may vary with different embodiments and may depend, for example, on the dimensions of the device to which the pigtail is to be attached. For one embodiment, the carrier tube 105 may be approximately 14 mm in length with a nominal 900 um outside diameter and a nominal 131 um inside diameter (e.g., to accommodate a 125 um fiber). The maria 205 may have an end taper dimension of nominally 250 um or approximately twice the diameter of a 125 um fiber, which may facilitate fiber insertion. The polyimide tube 203 may be approximately 6.35 mm in length and have an inside diameter of nominally 0.008 mm.

Figure 3:
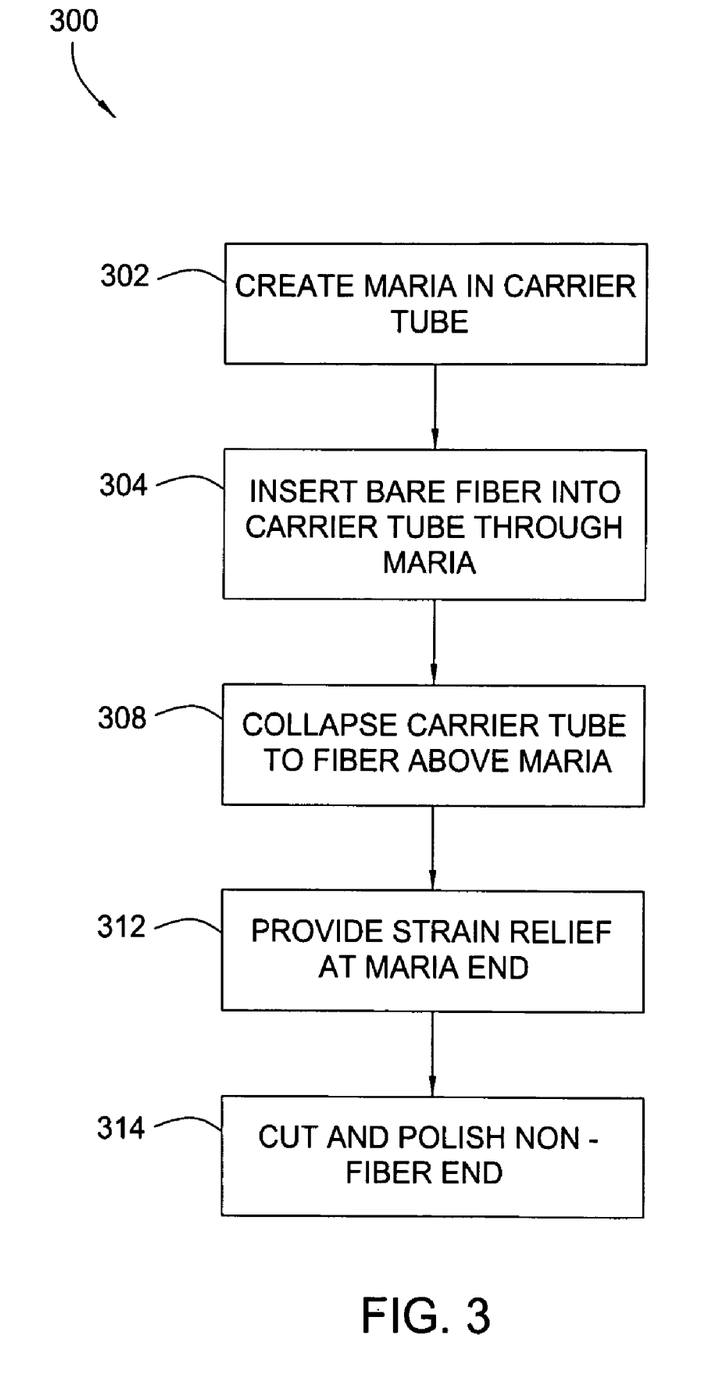
FIG. 3 is a flow diagram of exemplary operations for producing a low loss large diameter pigtail in accordance with one embodiment of the present invention.

FIG. 3 is a flow diagram of exemplary operations 300 for producing a low-loss large diameter pigtail in accordance with one embodiment of the present invention. The operations 300 may be performed by components of the system 100. Thus, the operations 200 may be described with reference to FIG. 1, as well as FIGS. 4-6 which illustrate components of an exemplary pigtail 102 at various stages of processing, according to various embodiments.

Figure 4:
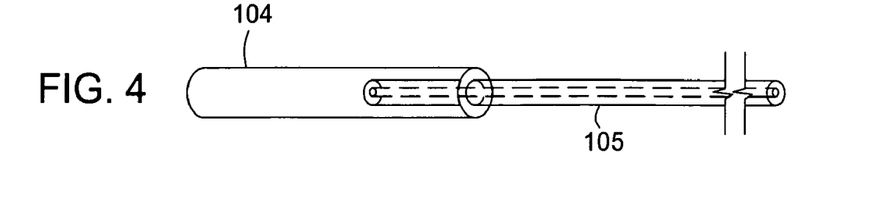
FIG. 4 is a side view of a carrier tube in a fixture in accordance with one embodiment of the present invention.
Figure 5A:
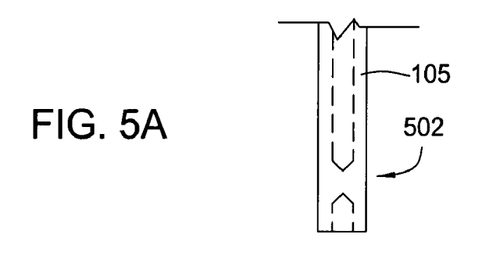
FIGS. 5A-5C are side views of a carrier tube at different stages of forming a maria in accordance with the present invention.
Figure 5B:
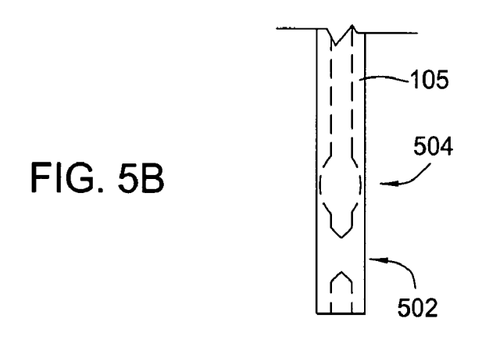
Figure 5C:
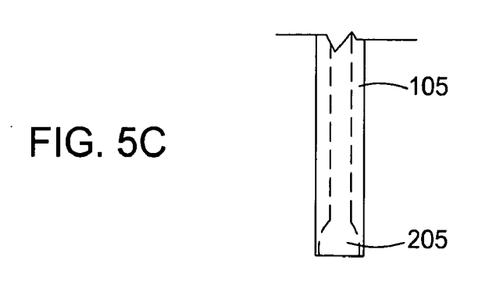

The operations 300 begin, at step 302 by creating a maria in a carrier tube. The maria may be formed using any suitable techniques and, in some cases, may be formed using the system 100. For example, as illustrated in FIG. 4, a "bare" tube 105 may be mounted in the fixture 104. While the tube 105 is shown in a horizontal position in FIG. 4, it may be advantageous to perform collapse operations with the workpiece in a vertical position (as shown in FIGS. 5A-5C), to prevent deformations due to gravity.

To form the maria, a partial collapse region 502 is formed in the tube 105 (e.g., by controlled exposure to the beams 115 while rotating the lathe 107 as previously described). In a subsequent operation, pressure above the partial collapse 502 may be increased, for example, by applying pressurized nitrogen gas to the upper portion of the tube 105. The upper portion of the tube may be simultaneously heated, resulting in an expanded section 504 above the partial collapse 502, as illustrated in FIG. 5B. The pressure, heat, and duration may be controlled to achieve a desired diameter of the expanded section (e.g., based upon the desired maria diameter). The tube 105 may then be scored along the expanded section 504, broken and polished, resulting in the maria 205 shown in FIG. 5C.

Figure 6A:
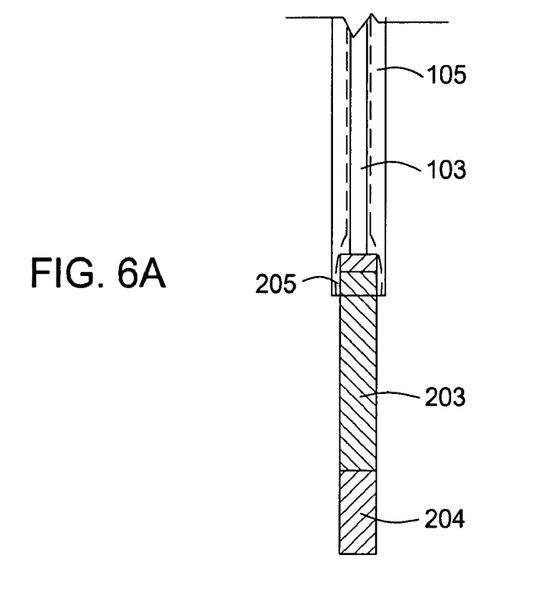
FIGS. 6A-6B are side views of a low loss large diameter pigtail assembly prior to and after final collapse, respectively, in accordance with one embodiment of the present invention.

At step 304, bare fiber is inserted into the tube 105 through the maria 205. For example, a length of coating 204 of a fiber 103 may be removed from one end of the fiber 103. The bare end may then be inserted into the maria 205, as shown in FIG. 6A, in preparation of a collapse process. As illustrated, the fiber 103 may be inserted until the top portion of the coating 204 reaches the top portion of the maria and an additional protective sleeve 203 may also be inserted into the maria 205. A vacuum may be applied to hold the workpiece in the fixture 104 and to assist in uniformly drawing the tube 105 to the fiber 103 during collapse.

Figure 6B:
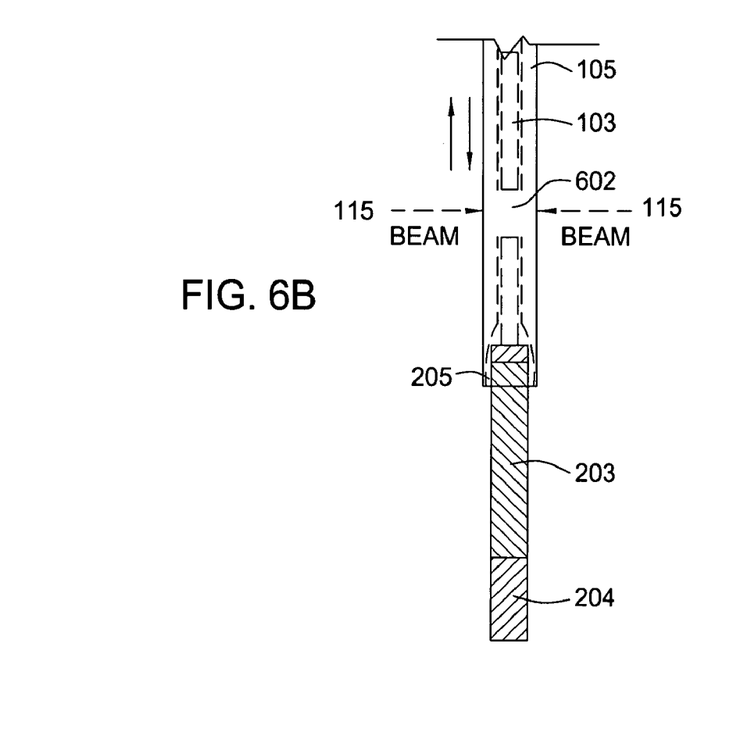

At step 308, the tube 105 is collapsed to the fiber 103 above the maria 205. For example, to perform the collapse, the workpiece may be translated up and down while being rotated by the lathe 107 to uniformly heat and collapse a collapse region 602, the length of which may vary. For example, for some embodiments, the collapse region 602 may begin 7 mm from the bottom (maria end) of the tube 103 and extend upward to 100 mm from the bottom. Thus, the workpiece may be translated a total distance of 93 mm (e.g., at a rate of 0.1 mm/sec) during the collapse operation. The laser power, and total duration of the collapse operations for complete collapse may depend on the dimensions of the workpiece components, and may range from seconds to minutes.

At step 312, strain relief is provided at the maria end of the pigtail. The strain relief may reinforce the pigtail 102 at the area of transition from the collapsed region 602 to the maria 205, which may be particular delicate and prone to stress. The stress relief may be provided by removing the protective sleeve 203 and inserting epoxy into the maria 205. The epoxy may be a specialized optical epoxy, such as epoxy sold under the designation 353ND, which is a two part epoxy manufactured by Epotek. In some cases, the pigtail 102 may be heated to wick epoxy up through the maria 205. The protective sleeve 203 may then be reinserted and the epoxy allowed to cure (e.g., via UV curing), thus providing strain relief and securing the protective sleeve 203 without interfering in the optical path.

At step 314, the non-fiber end is cut and polished, for example, to the slight curvature shown in FIGS. 2A-2B. Of course, the operations 300 illustrated in FIG. 3 are exemplary only and various of the operations may not be performed, while various other operations not illustrated may be performed. For example, for some embodiments, the tube 103 may be provided (purchased) with the maria 205 already formed, eliminating the need to perform step 302. Of course, various intermediate operations, such as cleaning (e.g., fire polishing), cooling, and the like, have been omitted from the flow diagram of FIG. 3 for clarity.

Figure 7A:
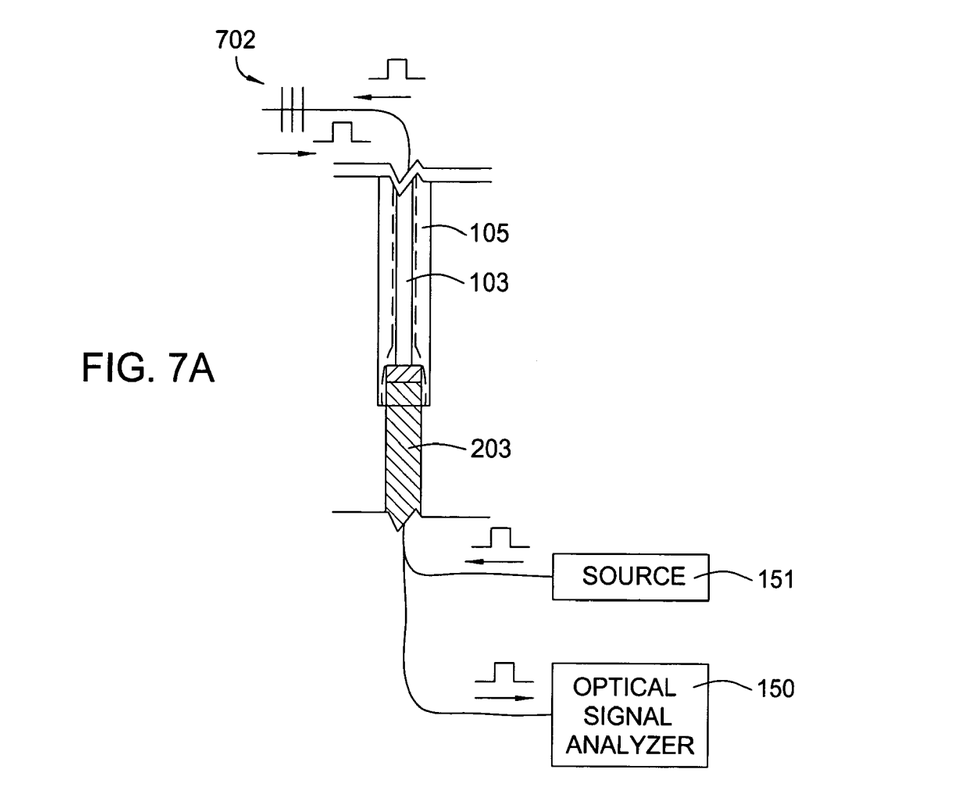
FIGS. 7A-7B are relational views that illustrate different techniques for measuring optical loss across a collapsed region according to embodiments of the present invention.

Further, for certain embodiments of the present invention, optical losses through the fiber may be monitored at various stages during the processing of the pigtail 102 (e.g., before, after and/or during collapse). For some embodiments where loss is to be measured, at least one grating 702 may be written into the fiber 103, as illustrated in FIG. 7A. The grating 702 should be written at a suitable wavelength, for example, near the wavelength at which the pigtail 102 and device attached thereto will be used (e.g., 1550 nm). The reflectivity of the grating 702 may be at least 5 dB above the noise floor. The grating may be written to the bare length of fiber 103, which should be long enough such that the grating 702 extends beyond the other end of the tube 105 by an adequate distance (e.g., a few mm).

Figure 7B:
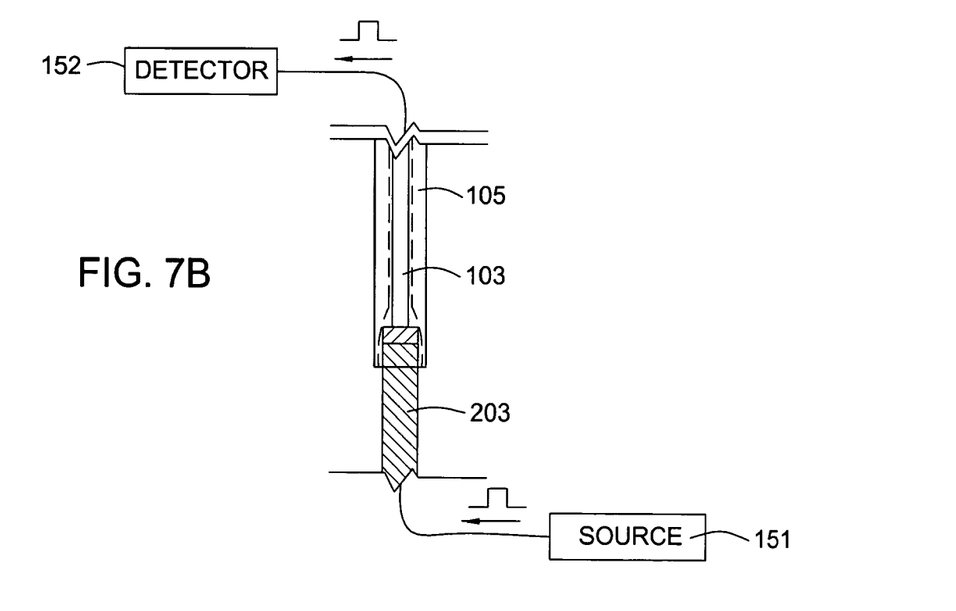

A broadband source 151 may generate pulses through the fiber, with the power of pulses reflected from the grating, for example, as measured by an optical signal analyzer 150, indicative of optical loss through the fiber 103. For other embodiments, rather than measure grating reflectivity, optical throughput measurements may be taken. For example, as illustrated in FIG. 7B, a source 151 can be attached to one end of the fiber 103 and a detector 152 may be attached to the other end of the fiber 103, for example, via a bare fiber adaptor (not shown).

In any case, measurements taken (grating reflectivity or through power) before and after the collapse may provide a measure of the loss due to the collapse. In other words, an initial measurement, before collapse, can be used as a reference level for the loss, based on the measurement after collapse. If reflectivity is measured, the difference between the reflectivity after the collapse and before the collapse indicates twice the loss through the collapse (due to the roundtrip path of the reflected pulse through the collapse region). The insertion loss associated with the type of pigtail 102 produced in accordance with techniques described herein typically ranges from 0.01 dB to 0.1 dB. The new grating reflectivity is now the reference level for the loss of the next collapse.

Measuring the loss during collapse operations may provide some insight into the improvements provided by the techniques described herein. For example, as the collapse begins and the tube 105 is initially exposed to the beams 115 with a vacuum applied, the collapse tends to start unevenly, as evidenced by an initial increase in loss, perhaps due to the fiber 103 attaching to one side of the tube 105 creating a microbend in the fiber 103. As the glass of the tube 105 melts further, the loss tends to decrease, perhaps as the collapse straightens out as the vacuum seal increases. The resultant straightening of the fiber 103 to the tube 105 may result in the reduced loss exhibited through the collapse region of the pigtail 102 produced in accordance with the techniques described herein.

In addition to reduced loss, another advantage of producing the pigtail 102 according to the present invention is that the inner diameter of the tube 105 does not have to tightly match the outer diameter of the fiber 103. In other words, an initial tight fit between the fiber 103 and tube 105 is not required. As a result, initial placement of the fiber 103 in the tube 105 prior to collapse may be facilitated and result in less fibers 103.

As described herein, embodiments of the present invention provide for large diameter pigtails (e.g., as illustrated in FIG. 2) exhibiting low optical losses (e.g., ranging from 0.01 to 0.10 dB). The low losses may be achieved through the controlled collapse of the carrier tube onto the fiber that allows for uniform "wetting" of the fiber to the tube and thus reduce micro bends in the fiber and the absence of epoxy in the optical path. The collapse may be controlled through the uniform application of heat through multiple laser beams and/or rotating the fiber-tube workpiece during collapse.

While the foregoing is directed to embodiments of the present invention, other and further embodiments of the invention may be devised without departing from the basic scope thereof, and the scope thereof is determined by the claims that follow.

The invention claimed is:

1. A method for producing an optical waveguide attachment device, comprising:
    inserting a bare end of an optical waveguide into a first end of a capillary tube, wherein a portion of the optical waveguide extends from the first end and a portion of the bare end extends from a second end of the capillary tube;
    taking a measurement of optical loss through a portion of the optical waveguide at or near a collapsed region to be formed;
    heating a portion of the capillary tube by exposure to at least two laser beams to collapse the capillary tube onto the optical waveguide to form the collapsed region;
    terminating both the optical waveguide and the capillary tube within the collapsed region to form an attachment end; and
    taking a measurement of optical loss through a portion of the optical waveguide inserted into the capillary tube after the heating by utilizing the portion of the bare end extending from the second end of the capillary tube.

2. The method of claim 1, further comprising rotating the capillary tube and optical waveguide during the heating.

3. The method of claim 1, further comprising applying a vacuum to the capillary tube and optical waveguide during the heating.

4. The method of claim 1, further comprising moving the capillary tube and optical waveguide along a longitudinal axis of the capillary tube during the heating.

5. The method of claim 1, wherein the at least two laser beams are each substantially simultaneously directed to different locations about the capillary tube.

6. The method of claim 1, wherein taking the measurements of optical loss before and after the heating comprises interrogating a grating written into the portion of the bare end extending from the second end of the capillary tube.

* * * * *